United States Patent
Kitchen

(10) Patent No.: US 7,756,962 B2
(45) Date of Patent: Jul. 13, 2010

(54) SYSTEM AND METHOD FOR ADVERTISING ON A NETWORK

(75) Inventor: James A Kitchen, Atlanta, GA (US)

(73) Assignee: Visioneering Holdings Inc., Cumming, GA (US)

(*) Notice: Subject to any disclaimer, the term of this patent is extended or adjusted under 35 U.S.C. 154(b) by 633 days.

(21) Appl. No.: 11/616,363

(22) Filed: Dec. 27, 2006

(65) Prior Publication Data

US 2007/0150573 A1  Jun. 28, 2007

Related U.S. Application Data

(60) Provisional application No. 60/597,979, filed on Dec. 28, 2005.

(51) Int. Cl.
*G06F 15/173* (2006.01)

(52) U.S. Cl. .............. 709/223; 709/203; 709/229; 705/14.27; 705/14.28; 705/14.33; 705/14.35; 705/14.36; 705/14.1; 705/14.69; 705/14.68; 705/14.67; 705/14.66; 705/14.73; 705/14.72; 705/14.39; 705/14.11; 705/14.13

(58) Field of Classification Search .......... 709/203.206, 709/229, 223, 203; 705/1–15, 14; 379/93.24
See application file for complete search history.

(56) References Cited

U.S. PATENT DOCUMENTS

| 6,285,985 | B1 * | 9/2001 | Horstmann | 705/14.61 |
|---|---|---|---|---|
| 7,103,643 | B1 * | 9/2006 | Jacobs et al. | 709/219 |
| 7,124,115 | B1 * | 10/2006 | Herzberg et al. | 705/64 |
| 7,219,139 | B2 * | 5/2007 | Martin et al. | 709/219 |
| 7,222,105 | B1 * | 5/2007 | Romansky | 705/57 |
| 7,363,302 | B2 * | 4/2008 | Lester | 707/7 |
| 7,373,599 | B2 * | 5/2008 | McElfresh et al. | 715/210 |
| 7,401,130 | B2 * | 7/2008 | Mason | 709/219 |
| 7,424,617 | B2 * | 9/2008 | Boyd et al. | 713/176 |
| 7,469,222 | B1 * | 12/2008 | Glazer | 705/27 |
| 7,584,287 | B2 * | 9/2009 | Schneider et al. | 709/229 |
| 2002/0010757 | A1 * | 1/2002 | Granik et al. | 709/218 |
| 2002/0087631 | A1 * | 7/2002 | Sharma | 709/203 |
| 2003/0236701 | A1 * | 12/2003 | Rowney et al. | 705/14 |
| 2006/0020517 | A1 * | 1/2006 | Brooks et al. | 705/26 |

* cited by examiner

*Primary Examiner*—Nathan Flynn
*Assistant Examiner*—Mohammad A Siddiqi
(74) *Attorney, Agent, or Firm*—Brouillette & Partners; Robert Brouillette

(57) ABSTRACT

A system for advertising to an end user in a computer network is provided. The system includes a server configured to transmit instructions to a client application to display an advertisement and a call-to-action for a reward in proximity to each other. The system is further configured to receive a response to the call-to-action for a reward from the user, and to transmit instructions to the client application to display an indication of a reward. A reward log database is provided in communication with the server. The reward log database is configured for logging the response to the call-to-action for a reward from the user. Methods for advertising and conveying a message, and a client application program product are also provided.

14 Claims, 7 Drawing Sheets

SYSTEM AND METHOD FOR ADVERTISING ON A NETWORK

CROSS REFERENCE TO RELATED APPLICATION(S)

This application claims the benefit of U.S. Provisional Application No. 60/597,979, filed Dec. 28, 2005, which is incorporated by reference as if fully set forth.

BACKGROUND

Promotional advertising is frequently employed to provide a revenue stream to an application provider or the publisher of content on a computer network such as the Internet. Frequently, the advertisements displayed are ignored or otherwise go unnoticed by the end user of an application in a computer network.

It would be desirable to provide a system and method to provide an incentive for an end user in a computer network to view an advertisement to increase the effectiveness of the advertisement.

SUMMARY

The present invention provides a system for advertising to an end user in a computer network. The system includes a server configured to transmit instructions to a client application to display an advertisement and a call-to-action for a reward in proximity to each other. The system is further configured to receive a response to the call-to-action for a reward from the user, and to transmit instructions to the client application to display an indication of a reward. A reward log database is provided in communication with the server. The reward log database is configured for logging the response to the call-to-action for a reward from the user.

The present invention also provides a method for advertising including providing a server. An advertisement and a call-to-action for a reward are transmitted from the server to a user, wherein the advertisement and the call-to-action for a reward are configured to be displayed in proximity to each other with a user interface. The method for advertising also includes receiving with the server from the user a response to the call-to-action for a reward, and transmitting from the server an indication of a reward to the user.

The present invention also provides a method of conveying a message to an end user in computer network. This method includes displaying a message, displaying a call-to-action for a reward, receiving from a user a response to the call-to-action for a reward, and displaying an indication of a reward.

The present invention further provides a client application program product including a non-transitory computer readable storage medium with instructions operable to enable a client computer to perform a procedure including identifying a user. The procedure also includes receiving an advertisement from a server, displaying the advertisement in a presentation vehicle, receiving a call-to-action for a reward from the server, and displaying the call-to-action for a reward in the presentation vehicle. The procedure further includes transmitting to the server a user response to the call-to-action, receiving an indication of a reward from the server, and displaying the indication of a reward in the presentation vehicle.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1A:
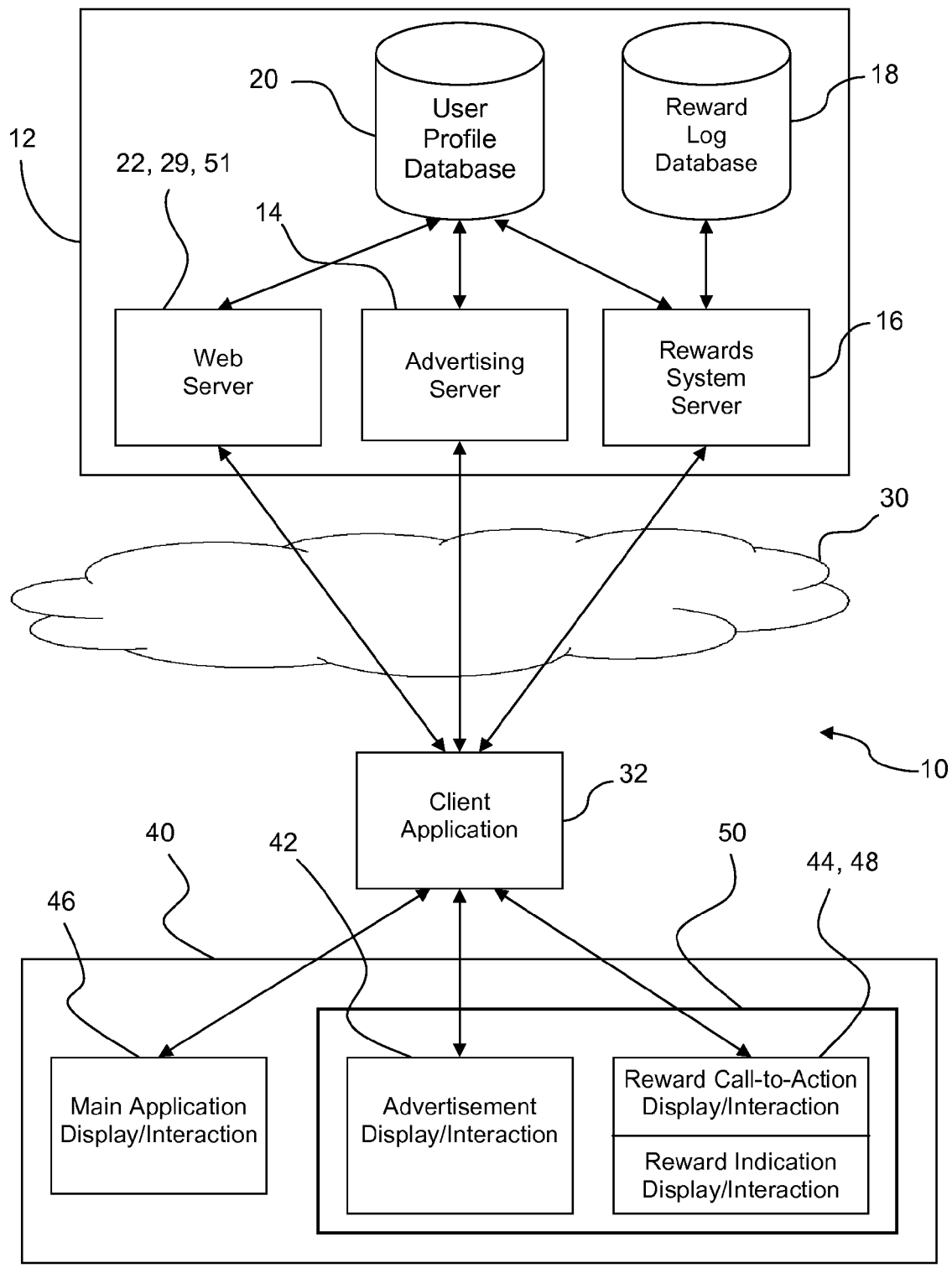
FIG. 1A is a schematic illustration of an exemplary operating environment in which a system for advertising according to a first preferred embodiment of the present invention may be used.

Certain terminology is used in the following description for convenience only and is not limiting. The words "right," "left," "top," and "bottom" designate directions in the drawings to which reference is made. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The preferred embodiments of the present invention are described below with reference to the drawing figures where like numerals represent like elements throughout.

Referring to FIG. 1A, a schematic illustration of an exemplary operating environment 10 in which a system 12, for advertising to an end user in a computer network according to a first preferred embodiment of the present invention, may be used. The advertising system 12 includes an advertising server 14, a rewards system server 16, and a reward log database 18 configured to communicate through a communication link 30 with a client application 32. The communication link 30 may include the Internet, an intranet or any suitable computer network. The client application 32 is preferably a web browser, for example Netscape™, Firefox, or Internet Explorer, which may implement other facilitating applications, for example JAVA, Flash, and Shockwave. Alternatively, the client application 32 may include any suitable application for example: a gaming, wordprocessing, searching, messaging and notification, data entry and modification, or tools including for example development tools. A user profile database 20 is preferably provided for storing user information. A web server 22 is preferably provided for transmitting instructions to the client application 32 for displaying content through a user interface 40. The web server 22 may include any suitable server configured for interface with web based or non-web based applications. While the web server 22, the rewards system server 16, and the advertising server 14 are shown as three separate servers in FIG. 1A, alternatively, these servers could be provided as any number of servers, for example a single server. It is to be understood that a server typically comprises a computer system, as known in the art.

The advertising server 14 is configured to transmit, through the communication link 30, a message including an advertisement 42, or alternatively including other suitable message or information content, to a user through the client application 32. Preferably, the client application 32 is configured to request the advertisement 42 in response to instructions received from the web server 22. Alternatively, the client application 32 may be configured only for receiving and displaying the advertisement 42 or other suitable information content, and in such case, the web server 22 is preferably configured to signal the advertising server 14 to transmit the advertisement 42 to the client application 32.

The client application 32 is configured to display the advertisement 42, or other message, with the user interface 40 of the end user, which preferably includes a CPU along with a monitor or other display device, for example a personal computer. The advertisement 42 is delivered in a presentation vehicle preferably provided by the web server 22 through the client application 32, the presentation vehicle preferably including an interactive window 50. The window 50 is preferably disposed in proximity to an interactive main application display 46 provided by the web server. The application display 46 may correspond to any suitable application, for example a gaming or news delivery application. Alternatively, the presentation vehicle may be provided without the window 50 and may instead be integrated in a suitable manner with the main application display 46.

The rewards system server 16 is configured to transmit, through the communication link 30, a call-to-action for a reward 44 to the user by implementing the client application 32. The rewards system server 16 is further configured to receive a response to the reward call-to-action 44 from the user, and to transmit an indication of a reward 48 to the user. The indication of a reward 48 may include for example a notification of promotional coupons or a notification of points redeemable for prizes, tangible or intangible, for example cash, merchandise, and accolades, earned as a result of the user's response to the reward call-to-action 44. Preferably, the client application 32 is configured to request the reward call-to-action 44 in response to instructions received from the web server 22. Alternatively, the client application 32 may be configured only for receiving and displaying the reward call-to-action 44 or other suitable information content from the rewards system server 16, and in such case, the web server 22 is preferably configured to signal the rewards system server 16 to transmit the reward call-to-action 44 to the client application 32.

As described above, the advertisement 42 and the reward call-to-action 44 are preferably transmitted directly to the client application 32, the web server 22 for example being configured to deliver a redirect to the client application 32 to extract content from the advertising server 14 and the reward systems server 16. A frequency plan, including a reward frequency plan 49, an advertisement frequency plan 51 and/or a combined advertisement/reward frequency plan, is preferably implemented in the web server 22 with instructions and content delivered to the client application 32 including instructions for timing extraction of advertisements 42 and reward call-to-actions 44 from the advertising server 14 and the rewards system server 16 respectively. Alternatively, the reward frequency plan 49, the advertisement frequency plan 51 and/or a combined advertisement/reward frequency plan may be implemented by the client application 32. Alternatively, a frequency plan may be implemented in one or both of the advertising server 14 and the rewards system server 16, and the instructions transmitted from the web server 22 to the client application 32 may include instructions to contact the advertising server 14 and the rewards system server 16 at predetermined time intervals with the timing of data extracted from them being determined by one or both of the advertising server 14 and the rewards system server 16.

The reward log database 18 is linked to the rewards system server 16 and is preferably configured for logging a user's response to the call-to-action for a reward 44. Further, the reward log database 18 preferably stores the indication of the reward 48 for transmission to the rewards system server 16, which ultimately delivers the indication of the reward 48 to the user interface 40 through the client application 32. The reward system server 16 preferably associates earned rewards with each of the users of the system 12, and stores earned reward information in the user profile database 20, or alternatively in the reward log database 18.

The reward log database 18 also preferably logs failures of a user to respond to the reward call-to-action 44. The rewards system server 16 is preferably configured such that after one or more user failures to respond to a reward call-to-action 44, the reward system server 16 transmits the indication of the reward 48 as an indication of a missed reward to the user. Preferably, the user is notified about what reward would have been obtained by the user had the user responded to one or more reward call-to-actions 44.

The web server 22 is preferably configured to transmit instructions to the client application 32, for example instructions enabling content in a browser, to display the advertisement 42 and the reward call-to-action 44 in proximity to each other through the user interface 40 in a window 50 of a presentation vehicle. The web server 22 may be further configured to transmit instructions to the client application 32 to display the advertisement 42 and the call-to-action for a reward 44 alternately in a predetermined time dependent manner. Instructions are also preferably provided to display the indication of a reward 48 transmitted by the reward system server 16, including for example any indication of a missed reward in proximity to the advertisement 42 and/or the reward call-to-action 44. Alternatively, the advertising server 14 and the reward systems server 16 may be configured to respectively transmit the advertisement 42 and the reward call-to-action 44 directly to the user interface 40 without utilizing the client application 32. The web server 22 is preferably configured to transmit instructions to the client application 32 to display the main application 46. Alternatively, the main application display 46 may be provided from a different source for example a different web server, or the client application 32 itself. Moreover, the client application 32 may alternatively be configured to display one or more of the advertisement 42, the reward call-to-action 44 and the main application display 46 in one or more of the above described manners without instructions from any web server.

Figure 2A:
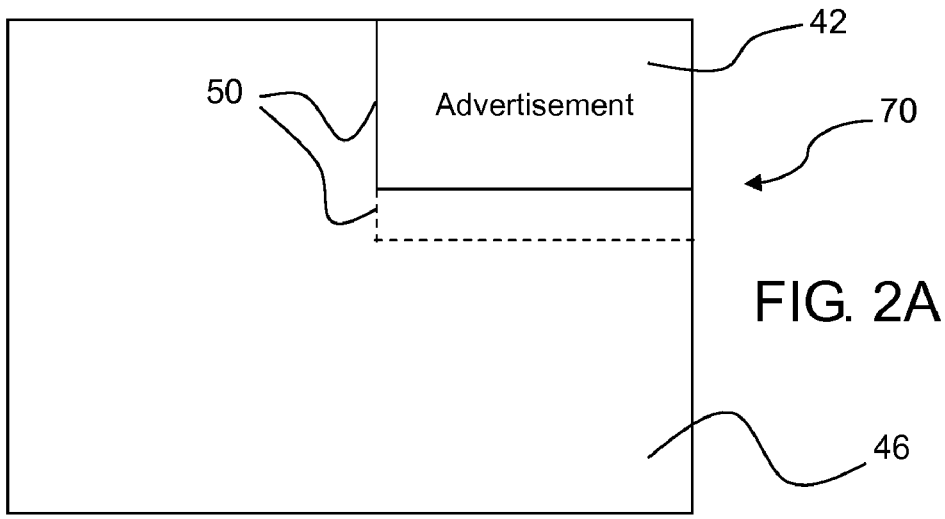
FIGS. 2A-2C show a first preferred user interface display output of the system for advertising of FIG. 1.
Figure 2B:
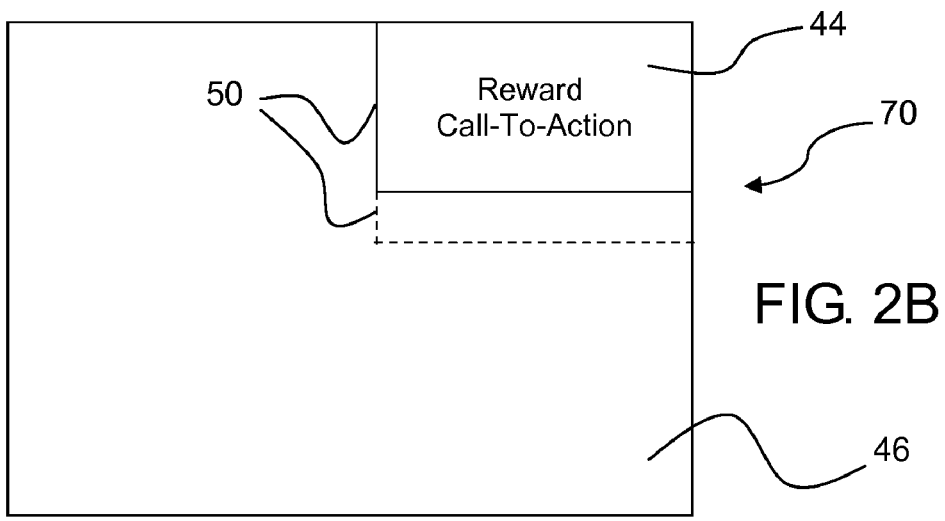
Figure 2C:
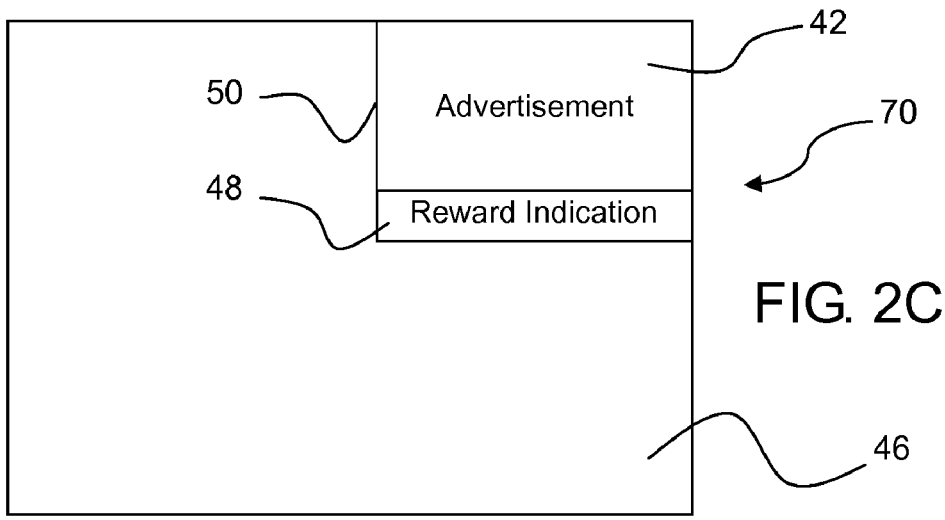

Referring to FIGS. 2A-2C, a first preferred display output 70 of the advertising system 12 is shown. FIG. 2A represents a first time period in which the display output 70 includes the window 50 which displays the advertisement 42 within the main application display 46. FIG. 2B represents a second time period in which the reward call-to-action 44 is displayed in the window 50 in the location where the advertisement 42 had been previously located. FIG. 2C represents a third time period in which the same or a different advertisement 42 and an indication of a reward 48 are displayed in the window 50.

The indication of a reward 48 may include information regarding what a user receives for responding to the reward call-to-action 44 through the user interface 40. Alternatively, the indication of the reward 48 may include an indication of a missed reward, for occasions where a user fails to respond to one or more reward call-to-actions 44, including information regarding what a user would have received had the user responded to the one or more reward call-to-actions 44. The displayed reward call-to-action 44 and the indication of a reward 48 give the user an incentive to frequently view the window 50 and thereby view the advertisement 42, or alternatively any other message, displayed in proximity thereto. The user's awareness and interest of the geographic area of the display output 70 containing the advertisement 42 is increased, thereby raising the awareness and effectiveness of the advertisement.

Preferably, each of the first, second and third time periods of the display output 70 last a suitable length of time, for example 5-10 seconds, for a user to view the advertisements 42, the reward call-to-actions 44, and the reward indications 48 while the user is interacting with the main application display 46. The displays of the first, second and third time periods (shown in FIGS. 2A, 2B and 2C respectively) preferably follow each other substantially consecutively and in a repeating fashion. Alternatively, the display of the first time period may be omitted and only the displays of FIGS. 2B and 2C provided in an alternating repeating fashion. While the advertisements 42, the reward call-to-actions 44 and the reward indications 48 are shown provided in a window 50, alternatively, they may be provided in two or more windows, or provided integrally with the main application display 46, or provided in any suitable presentation vehicle in any suitable manner. The advertisements 42 preferably allow interaction with a user and may include for example a hyperlink to an advertiser's website through the Internet. Further, the advertisements 42 preferably include a plurality of different advertisements 42 which are alternately displayed in a random or pseudo-random fashion.

Figure 3A:
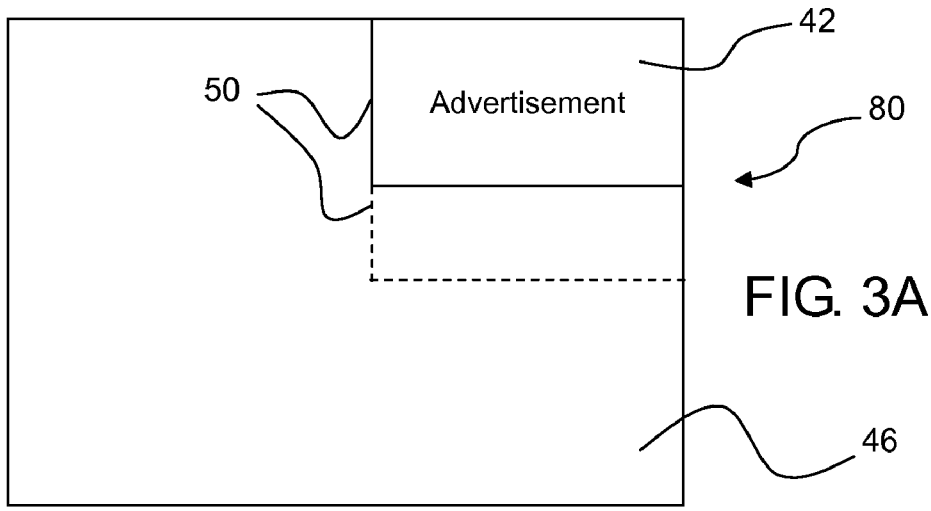
FIGS. 3A-3C show a second preferred user interface display output of the system for advertising of FIG. 1.
Figure 3B:
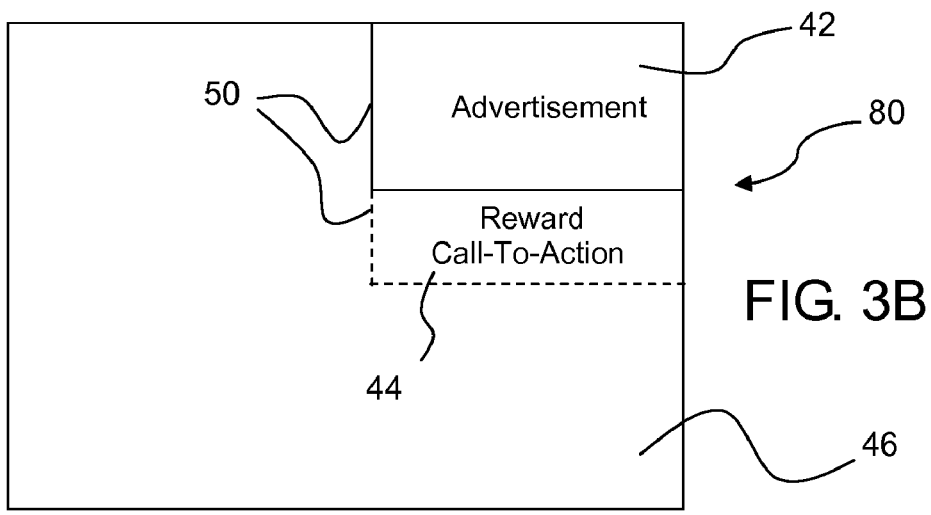
Figure 3C:
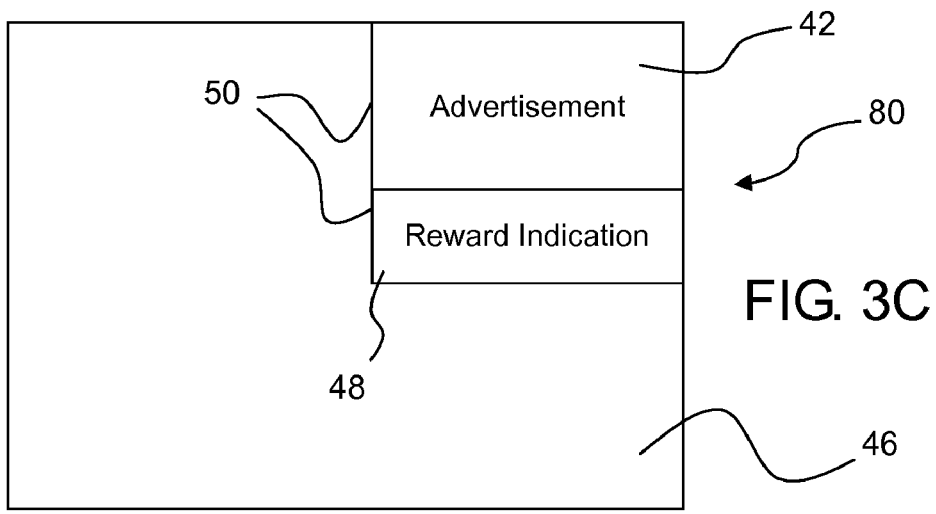

Referring to FIGS. 3A-3C a second preferred display output 80 of the advertising system 12 is shown. FIG. 3A represents a first time period in which the display output 80 includes a window 50 which displays the advertisement 42 within the main application display 46. FIG. 3B represents a second time period in which the reward call-to-action 44 is displayed adjacent to the advertisement 42. FIG. 3C represents a third time period in which the same or different advertisement 42 and an indication of a reward 48 are displayed in the window 50. The displays of the first, second and third time periods (shown in FIGS. 3A, 3B and 3C respectively) preferably follow each other substantially consecutively and in a repeating fashion, each lasting a suitable length of time, for example 5 to 10 seconds. Alternatively, the display of the first time period can be omitted and only the displays of FIGS. 3B and 3C provided in an alternating repeating fashion. Further, the advertisements 42 preferably include a plurality of different advertisements 42 which are alternately displayed in a random or pseudo-random fashion.

Referring to the first and second preferred display outputs 70, 80, the web server 22 is preferably configured to define the positioning and visual qualities of the advertisement 42, the reward call-to-action 44, the main application display 46, and the indication of a reward 48 in the display output. Alternatively, one or both of the advertisement server 14 and the reward system server 16 may be configured to define one or both of the positioning and/or the visual qualities of the advertisement 42, reward call-to action 44, and the indication of a reward 48, and the web server 22 may be configured to define the positioning and visual qualities of remaining features, including the main application display.

The user profile database 20 is preferably in communication with the advertising server 14, the reward system server 16 and the web server 22, and is configured to store information transmitted by the user. Identifying information is stored in the user profile database 20 to permit a user to be associated with responses to reward call-to-actions 44, which are preferably stored in the reward log database 18, or alternatively in the user profile database 20. Preferably, the user profile database 20 also stores user personal information, for example user age, gender, and occupation information entered by the user, or otherwise obtained, for use by the advertising server 14 to determine which advertisements 42 are transmitted to the client application 32. Preferably, the web server 22, or alternatively the client application 32 by instruction of the web server 22, is configured to associate user-identifying information with a user by gathering user or user interface supplied information and authenticating the information in the user profile database 20. Alternatively, if an authentication process or a user profile database is not provided, the web server 22, or alternatively the client application 32 by instruction of the web server 22, may be configured to create a new and unique identifier each time a user interacts with the advertisement 42 or the reward call-to-action 44.

Figure 1B:
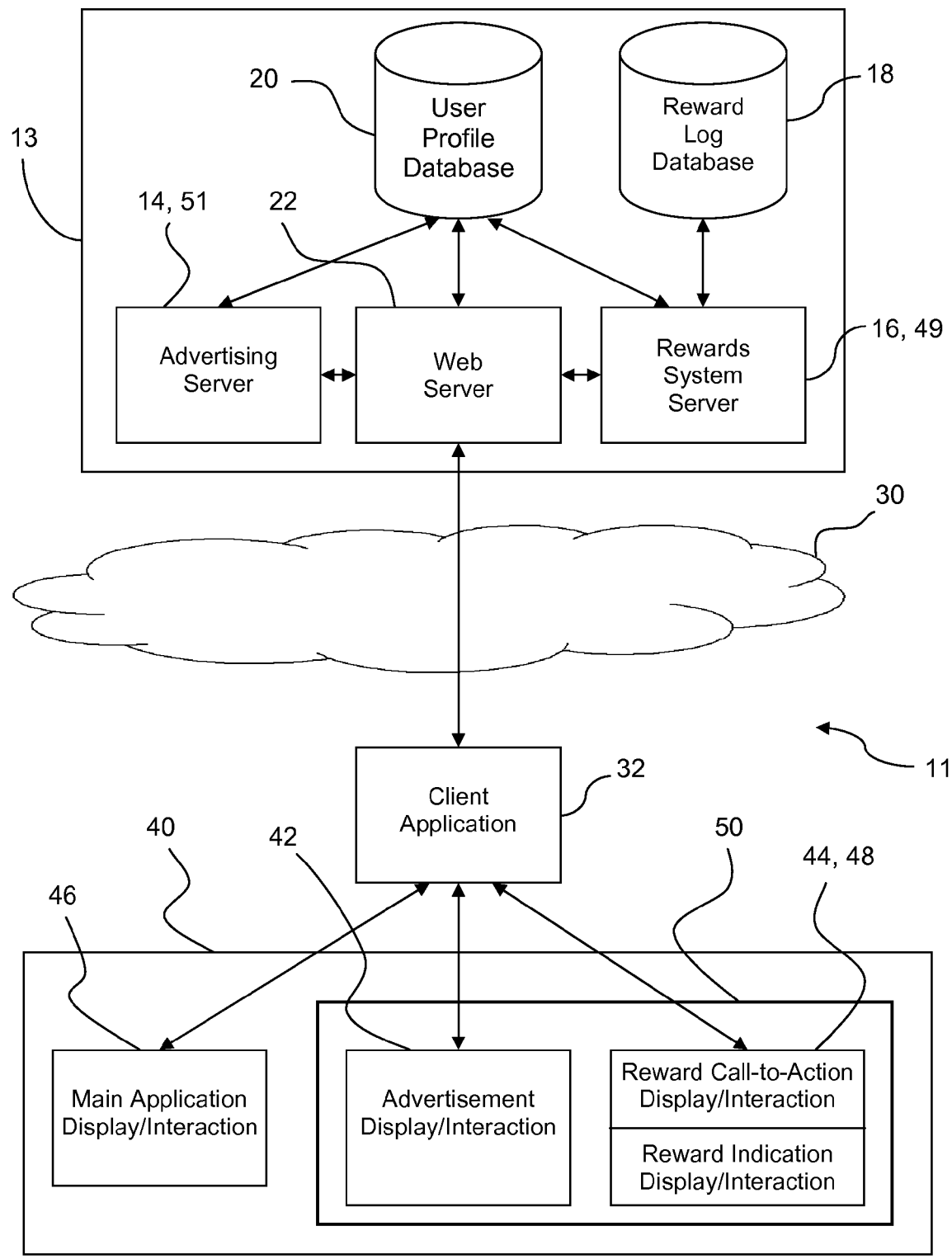
FIG. 1B is a schematic illustration of an exemplary operating environment in which a system for advertising according to a second preferred embodiment of the present invention may be used.

Referring to FIG. 1B, a schematic illustration of an exemplary operating environment 11 in which a system 13, for advertising to an end user in a computer network according to a second preferred embodiment of the present invention, may be used. In this second preferred embodiment, the web server 22 preferably processes the advertisement 42 and the reward call-to-action 44 and forwards them to the client application 32. The advertising server 14 and the rewards system server 16 are preferably linked to the web server 22 on a back-end. The web server 22 in the process of building instructions, for example instructions and content for a web page, may call one or both of the advertising server 14 and the rewards system server 16. While the web server 22, advertising server 14, rewards system server 16, user profile database 20 and reward log database 18 are shown as directly linked in the system 13, alternatively, any one or all of these components could be linked through the Internet, intranet or any suitable network.

In the preferred case where the client application 32 is a web browser, content and link codes may be provided back to the web server 22 from one or both of the advertising server 14 and the rewards system server 16, then the web server may build a web page from the data received, preferably in one of the manners described with reference to FIGS. 2A-2C and 3A-3C. Subsequently, the web page may be delivered to the client application 32 by the web server 22.

In the system 13, the rewards system server 16 is preferably also configured to transmit the reward frequency plan 49 to the web server 22, from which it may be transmitted to the client application 32. The transmission of the reward frequency plan 49 may occur for example in response to a request for an advertisement 42 transmitted by the client application 32, or alternatively, a request transmitted by the web server 22 on behalf of the client application 32. The reward frequency plan 49 includes instructions for the timing of the reward call-to-action 44. The reward frequency plan 49 is preferably implemented by the web server 22 or the client application 32. Alternatively, the reward frequency plan 49 may be implemented using the rewards system server 16. The advertisement frequency plan 51 is preferably provided by the advertising server 14 for timing the advertisements 42, and is preferably implemented by web server 22 or the client application 32, or alternatively, the advertising server 22. Alternatively, in the case where the advertising server 14 and the rewards system server 16 are provided as a single server, the call-to-action frequency plan 49 and the advertisement frequency plan 51 may be provided as a single advertisement/reward frequency plan.

Figure 4:
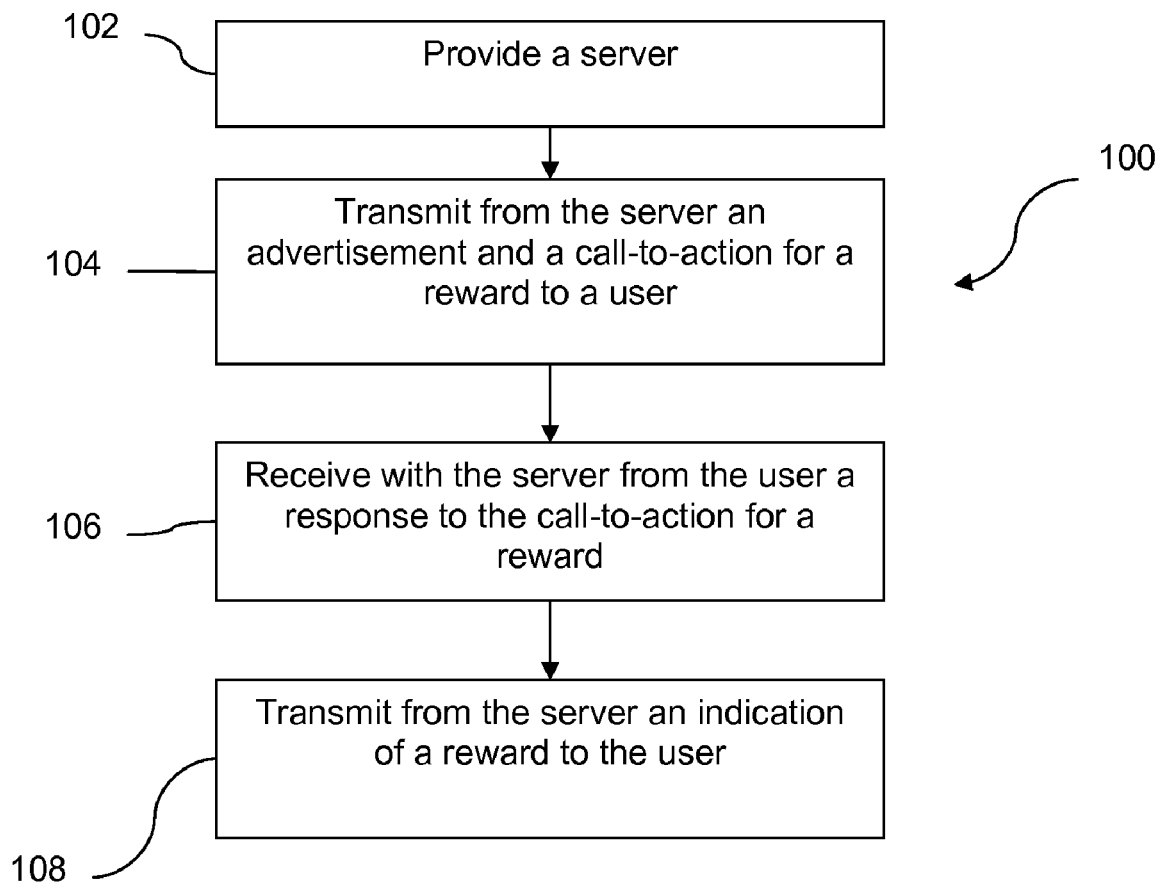
FIG. 4 is a diagram of a method of advertising according to a preferred embodiment of the present invention.

Referring to FIG. 4, a method 100 for advertising according to a preferred embodiment of the present invention is shown. The method 100 includes providing a server (step 102) and transmitting from the server an advertisement and a call-to-action for a reward to a user (step 104). Preferably, the advertisement and the call-to-action for a reward are configured to be displayed in proximity to each other within a display of a user interface. A user response to the call-to-action for a reward is received with the at least one server (step 106). An indication of a reward is transmitted to the user (step 108).

Preferably, the method 100 includes transmitting from the server to a client application of the user instructions for: displaying the advertisement using the user interface in a display area, displaying the reward call-to-action in proximity to the display area of the advertisement, transmitting the user response to the server, and displaying the indication of the reward. The method 100 also preferably includes providing a user profile database in communication with the server, receiving user information, querying the user information against the user profile database, assigning the user with a unique user-identifier, and transmitting the unique user-identifier to the user with the server. The method 100 also preferably includes providing the server with a rewards system server in communication with a rewards log database, and logging indications of a reward with the user information associated thereto through the rewards system server to the rewards log database to keep a record of a user's indications of a reward. Alternatively, if a user profile database has not been provided or if a user has not been previously authenticated, the unique user-identifier transmitted to the user may allow the user to track indications of a reward and claim earned rewards.

Figure 5:
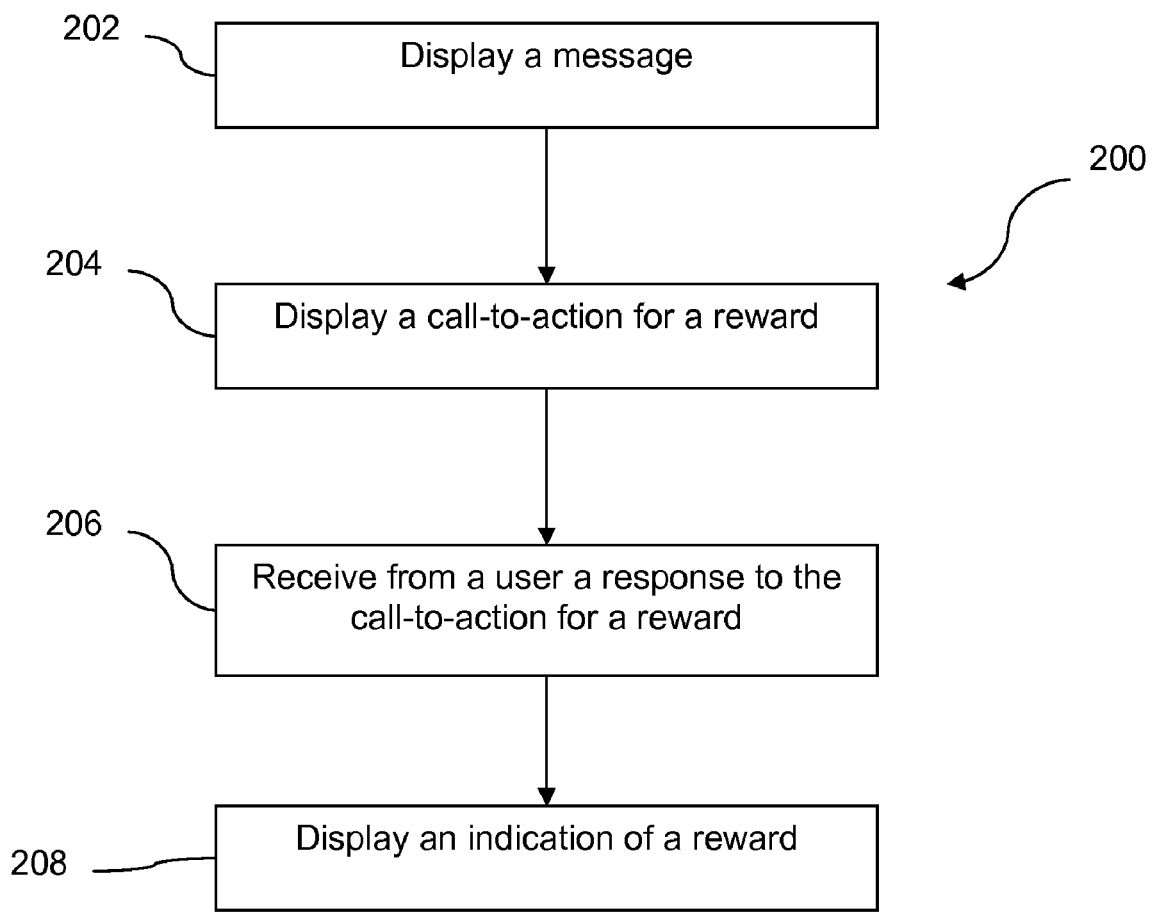
FIG. 5 is a diagram of a method of conveying a message to an end user in a computer network according to a preferred embodiment of the present invention.

Referring to FIG. 5, a method 200 of conveying a message to an end user in a computer network according to a preferred embodiment of the present invention is shown. The method 200 includes displaying a message (step 202) and displaying a call-to-action for a reward (step 204). A response from a user to the call-to-action for a reward is received (step 206), and an indication of a reward is displayed (step 208).

Preferably, the method 200 includes displaying a plurality of call-to-actions for a reward, logging a plurality of responses and/or failures of a user to respond to the reward call-to-actions, displaying the indication of a reward as an indication of a missed reward in response to the failures to respond to the reward call-to-actions, and displaying the indication of a reward as an indication of an obtained reward in response to the response to the call-to-action for a reward. A presentation vehicle including one or more windows is preferably provided for displaying the message, and displaying the reward call-to-action in proximity to the message or in the same geographic location as the message, for example overlapped or adjacent to the message as discussed above with reference to FIGS. 3A-3C. Alternatively, the reward call-to-action may be displayed at or near a geographic location of the message with the reward call-to-action being displayed after the display of a message and before a subsequent display of the same or a different message, whereby the message and the call-to-action are displayed alternately in the presentation vehicle at different predetermined times, for example as discussed above with reference to FIGS. 2A-2C. Further, location and timing of display of messages, reward call-to-actions, and indications of rewards may be controlled by predefined calculations and may employ randomness or pseudo-randomness.

Figure 6:
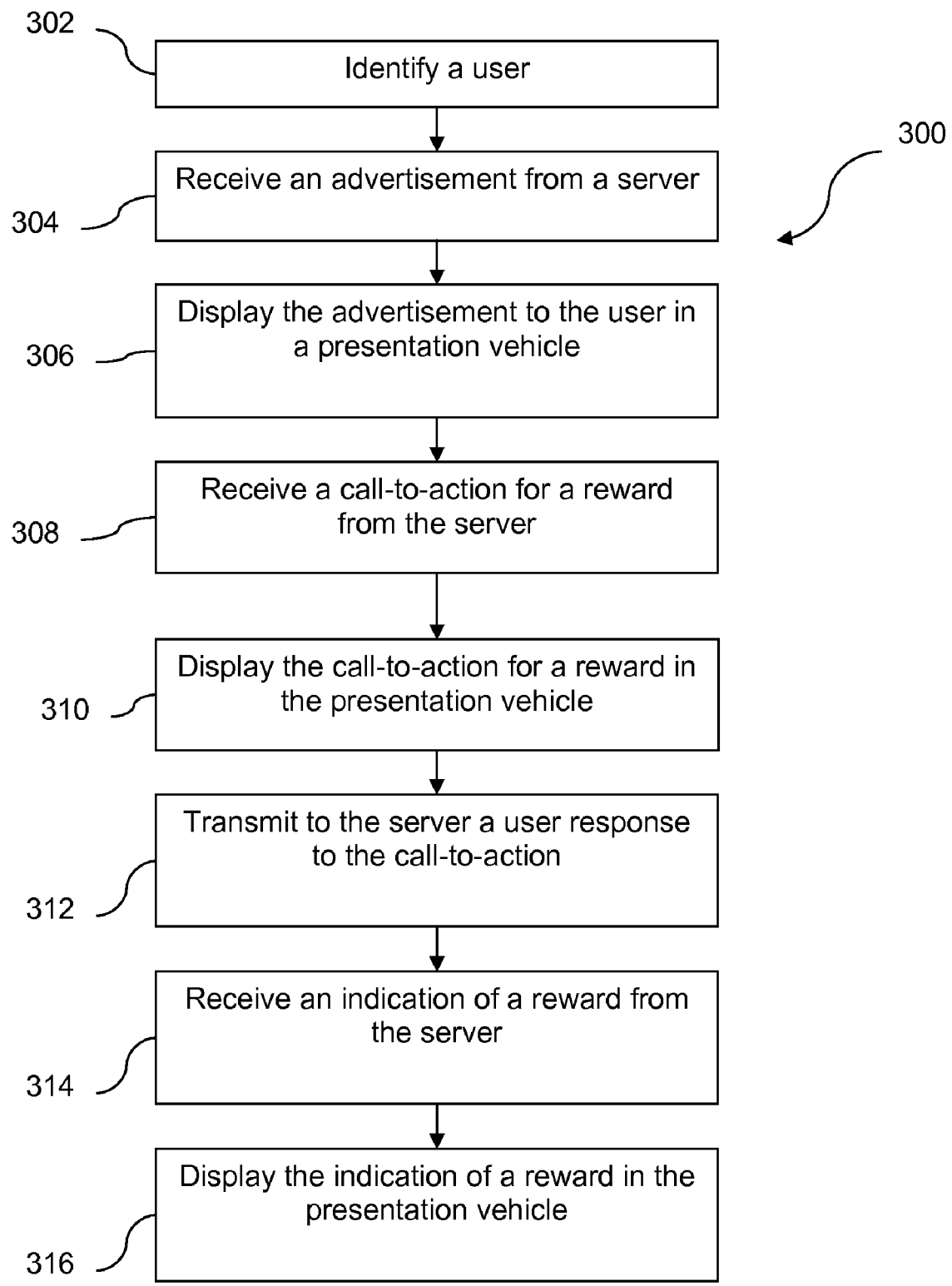
FIG. 6 is a diagram of a procedure enabled by a client application program product according to a preferred embodiment of the present invention.

Referring to FIG. 6, a client application program product, for example the client application 32 of FIG. 1, according to a preferred embodiment of the present invention, comprises a non-transitory computer readable storage medium with instructions operable to enable a client computer to perform a procedure 300. The procedure 300 includes identifying a user (step 302). An advertisement is received from the server (step 304). The advertisement is displayed in a presentation vehicle (step 306), and a call to action for a reward is received from the server (step 308). The reward call-to-action is displayed in the presentation vehicle (step 310), and a user response to the reward call-to-action is transmitted to the server (step 312). An indication of a reward is received from the server (step 314) which is displayed in the presentation vehicle (step 316). Preferably, the instructions are further operable to enable a client computer to request the advertisement and the reward call-to-action from the server. While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A system for advertising to an end user in a computer network, the system comprising:
   at least one server:
   configured to transmit instructions to a client application to display:
   during a first period, an advertisement and a call-to-action for a reward;
   during a second period, an indication of a reward;
   during a third period, an indication of a missed reward based on at least one user failure to respond to the call-to-action for a reward;
   wherein said first period, said second period and said third period are displayed in proximity to each other and in the same main application display and wherein said first period, said second period and said third period follow each other substantially consecutively and in a repeating fashion determined by a frequency plan implemented by at least one of the client application and the at least one server, and wherein the server is configured to receive a response to the call-to-action for a reward from the user; and wherein the at least one server is configured to transmit instructions to the client application to display an indication of a missed reward based on at least one user failure to respond to the call-to-action for a reward; and
   a reward log database in communication with the at least one server, the reward log database configured for logging the response to the call-to-action for a reward from the user;
   an advertising server configured to generate the advertisement;
   a reward system server configured to generate the call-to-action for a reward;
   a web server configured to receive the advertisement from the advertising server, and to receive the call-to-action for a reward from the reward system server.

2. The system for advertising according to claim 1, wherein the at least one server comprises:

a web server which is configured to transmit instructions to the client application to receive the advertisement from an advertising server, receive the call-to-action for a reward from a reward system server.

3. The system for advertising according to claim 1, further comprising a user profile database in communication with the at least one server, the user profile database configured for storing user information, and the at least one server is configured to associate the user information with the user.

4. A method for advertising comprising:
providing at least one server;
transmitting instructions to display from the at least one server to a client application of the user:
during a first period, an advertisement and a call-to-action for a reward;
displaying the call-to-action for a reward with the user interface in proximity to the display area of the advertisement;
during a second period, an indication of a reward;
during a third period, an indication of a missed reward based on at least one user failure to respond to the call-to-action for a reward;
wherein said advertisement, said call-to-action, said indication of a reward and said indication of a missed reward are displayed with the user interface in the same display area, and wherein said first period, said second period and said third period follow each other substantially consecutively and in a repeating fashion determined by a frequency plan implemented by at least one of the client application and the at least one server, and wherein the server is configured to receive a response to the call-to-action for a reward from the user;
receiving with the at least one server from the user a response to the call-to-action for a reward; and
transmitting from the at least one server an indication of a reward to the user.

5. The method of claim 4, further comprising:
providing a user profile database in communication with the at least one server;
receiving user information of a user with the at least one server;
querying the user information against the user profile database; and
assigning the user with a unique user-identifier, and transmitting with the at least one server the user-identifier to the user.

6. The method of claim 4, further comprising:
implementing a frequency plan employing at least one of randomness and pseudo-randomness for timing the display of at least one of the advertisement and the call-to-action for a reward.

7. A method of conveying a message in a window within a main application to an end user in computer network, the method comprising:
displaying at least one message in a window of an application interface;
displaying a call-to-action for a reward in said window of said application interface, in proximity to a display area of the at least one message, alternately displaying the at least one message and the call-to-action for a reward in the presentation vehicle;
receiving from a user a response to the call-to-action for a reward;
displaying an indication of a reward;
displaying the indication of a reward in said window of said application interface, as an indication of a missed reward in response to a user's failure to respond to the call-to-action for a reward;
displaying each of the plurality of messages for a first predetermined period of time in the window; and
displaying the call-to-action for a reward in the window in proximity to the at least one message for a second predetermined period of time;
wherein at least one of the first and second predetermined periods of time are variable and determined on the basis of at least one of randomness and pseudo-randomness and first and second predetermined period of time are alternately displayed.

8. The method of claim 7, further comprising:
displaying a plurality of call-to-actions for a reward;
logging a plurality of failures of a user to respond to the plurality of call-to-actions for a reward; and
displaying the indication of a reward as an indication of a missed reward in response to the plurality of failures to respond to the plurality of call-to-actions for a reward.

9. The method of claim 7, further comprising:
displaying a plurality of call-to-actions for a reward;
logging at least one response to the plurality of call-to-actions for a reward; and
displaying the indication of a reward as an indication of an earned reward in response to the at least one user response to the plurality of call-to-actions for a reward.

10. The method of claim 7, further comprising:
providing a presentation vehicle comprising a window;
displaying the at least one message in the window; and
displaying the call-to-action for a reward in the window at least one of adjacent to and overlapped with the message.

11. The method of claim 7, further comprising:
providing a presentation vehicle comprising a first window and a second window;
displaying the at least one message in the first window; and
displaying the call-to-action for a reward in the second window adjacent to the first window.

12. The method of claim 7, further comprising:
providing a presentation vehicle comprising a window; and
alternately displaying the at least one message and the call-to-action for a reward in the window, wherein the message and the call-to-action for a reward are positioned substantially in the same location in the window at substantially different times.

13. A client application program product comprising a non-transitory computer readable storage medium comprising instructions, the instructions being operable to enable a client computer to perform a procedure comprising:
identifying a user;
receiving an advertisement from at least one server during a first period;
displaying the advertisement in window of a presentation vehicle;
receiving a call-to-action for a reward from the at least one server during a second period;
displaying the call-to-action for a reward in the window of the presentation vehicle in proximity to the advertisement;
transmitting to the at least one server a user response to the call-to-action for a reward;
receiving an indication of a reward from the at least one server;
displaying the indication of a reward in the window of the presentation vehicle;

receiving an indication of at least one missed reward during a third period, in response to at least one failure of the user to respond to the call-to-action for a reward; and displaying an indication of the at least one missed reward in response to the user's at least one failure to respond to the call-to-action for a reward;

wherein said first period, said second period and said third period are displayed in proximity to each other and in the same main application display and wherein said first period, said second period and said third period follow each other substantially consecutively and in a repeating fashion determined by a frequency plan implemented by at least one of the client application and the at least one server, and wherein the server is configured to receive a response to the call-to-action for a reward from the user; and wherein the at least one server is configured to transmit instructions to the client application to display an indication of a missed reward based on at least one user failure to respond to the call-to-action for a reward.

14. The client application program product of claim 13, wherein the instructions of the non-transitory computer readable storage medium are operable to enable a client computer to perform the procedure further comprising:

requesting the advertisement from the at least one server; and requesting the call-to-action for a reward from the at least one server.

* * * * *

UNITED STATES PATENT AND TRADEMARK OFFICE
CERTIFICATE OF CORRECTION

PATENT NO. : 7,756,962 B2  Page 1 of 1
APPLICATION NO. : 11/616363
DATED : July 13, 2010
INVENTOR(S) : James A Kitchen It is certified that error appears in the above-identified patent and that said Letters Patent is hereby corrected as shown below:

Title page, item [75]
The inventors of the above-identified patent should read as follow: Donald J. Fietchter, Cumming, GA (US); Clinton A. Lowe, Suwannee, GA (US); James A Kitchen, Anniston, AL (US);

Signed and Sealed this
Twelfth Day of July, 2011

David J. Kappos
*Director of the United States Patent and Trademark Office*